United States Patent [19]

Hosoi et al.

[11] Patent Number: 5,610,333

[45] Date of Patent: Mar. 11, 1997

[54] SEMICONDUCTOR TYPE GAS RATE SENSOR

[75] Inventors: Takashi Hosoi; Atsushi Inaba; Mizuho Doi, all of Wako, Japan

[73] Assignee: Honda Giken Kogyo Kabushiki Kaisha, Tokyo, Japan

[21] Appl. No.: 406,328

[22] Filed: Mar. 17, 1995

[30] Foreign Application Priority Data

Mar. 18, 1994 [JP] Japan .................... 6-087112

[51] Int. Cl.⁶ .................................................. G01P 9/00
[52] U.S. Cl. ........................ 73/504.06; 73/514.03
[58] Field of Search ................ 73/504.06, 504.05, 73/514.03, 514.06, 514.07, 204.26

[56] References Cited

U.S. PATENT DOCUMENTS

| | | | |
|---|---|---|---|
| 3,500,690 | 3/1970 | Schuemann | 73/504.06 |
| 3,581,578 | 6/1971 | Schuemann | 73/504.06 |
| 4,594,894 | 6/1986 | Moffatt | 73/504.06 |
| 5,107,707 | 4/1992 | Takahashi et al. | 73/504.06 |

FOREIGN PATENT DOCUMENTS 329858  2/1991  Japan .

Primary Examiner—Richard Chilcot
Assistant Examiner—Harshad Patel
Attorney, Agent, or Firm—Lyon & Lyon

[57] ABSTRACT

A semiconductor type gas rate sensor which is capable of accurately sensing with a sufficient sensitivity an angular velocity acting on its body made of semiconductor substrates having a nozzle port and a gas path etched therein with a pair of heat wires (heat-sensitive resistance elements) provided in the gas path, wherein an optimal flow of gas injected into the gas path through the nozzle port is ensured by designing the nozzle port of 300 to 1000 microns in width and of not less than 2 mm in length and providing the gas path at its downstream end with an outlet allowing the gas to flow straight out from the gas path therethrough.

14 Claims, 6 Drawing Sheets

SEMICONDUCTOR TYPE GAS RATE SENSOR

BACKGROUND OF THE INVENTION

The present invention relates to a semiconductor type gas rate sensor which is capable of electrically detecting a deflection of a gas flow in a gas path when an angular velocity acts on the sensor body and, more particularly, to a semiconductor type gas rate sensor whose body is made of semiconductor substrates.

A conventional gas rate sensor is ordinarily designed to force gas through a nozzle port into a gas path toward a pair of heat wires (heat-sensitive resistance elements) arranged on the right and the left of the gas path, to sense a change of differential resistance in the paired heat wires, which is produced when the gas flow is deflected to the left or the right by the action of an angular velocity applied to the sensor body, and to produce a detection signal corresponding to the differential output of the paired heat wires, by which a direction and a value of the angular velocity acting on the sensor body can be determined.

In Japanese Laid-Open Patent Publication No. 3-29858 there is disclosed a miniature semiconductor type gas rate sensor whose body has a gas path and a pair of heat-wires arranged therein and is manufactured by semiconductor micro-machining on the basis of IC technology.

As shown in FIGS. 3 to 5, the body of the semiconductor type gas rate sensor is constructed in such a way that a lower semiconductor substrate 1' having a half nozzle port 31 and a half groove 41 etched thereon and an upper semiconductor substrate 2' having a half nozzle port 31 and a half groove 41 etched thereon are bonded to each other so as to precisely couple the half ports 31 and the half grooves 41 to form a nozzle port 3' and a gas path 4' in the assembled body.

The lower semiconductor substrate 1' has a bridge portion 6 formed across the gas path 4' and a pair of heat wires 51 and 52 formed by patterning on the etch-formed bridge portion 6. In FIG. 1, electrodes 7 are formed at the outside end of each heat wire by patterning.

To make the gas rate sensor having the thus constructed body be sensitive enough to accurately detect an angular velocity acting on its body, it is necessary to realize an optimal flow of gas formed through a nozzle port 3' into the gas path 4' in the sensor body to satisfy various conditions which will be described later. In this connection, it is increasingly important to select a suitable form and size of the sensor body. In other words, the size and form of the gas rate sensor have not been sufficiently considered to this day with the viewpoint of attaining the optimal conditions of a flow of gas forced into the gas path in the sensor body through the nozzle port.

SUMMARY OF THE INVENTION

Accordingly, an object of the present invention is to provide a semiconductor type gas rate sensor whose body is featured by having:

a nozzle port of 300 to 1000 microns in width;

a nozzle port of not less than 2 mm in length; and a gas outlet in the innermost part of a gas path to allow gas to flow straight out therefrom.

DESCRIPTION OF THE PREFERRED EMBODIMENTS

A preferred embodiment of the present invention now will be described by way of example and with reference to the accompanying drawings.

Figure 1:
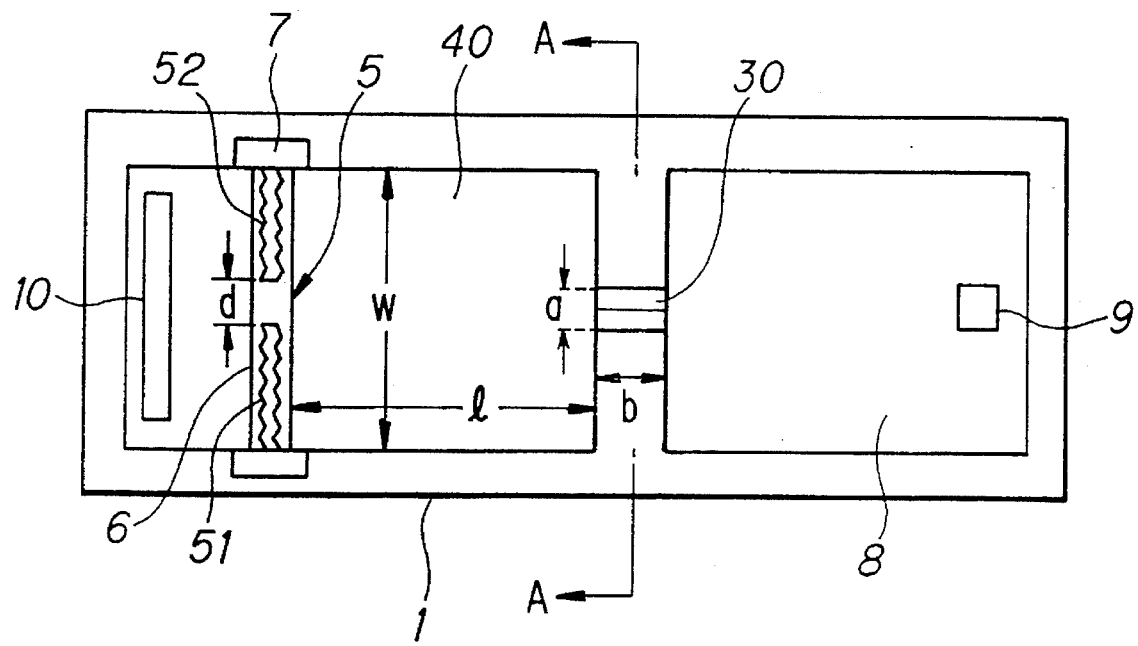
FIG. 1 is a plan view showing an example of a lower semiconductor substrate portion of a body of a semiconductor type gas rate sensor according to the present invention.
Figure 2:
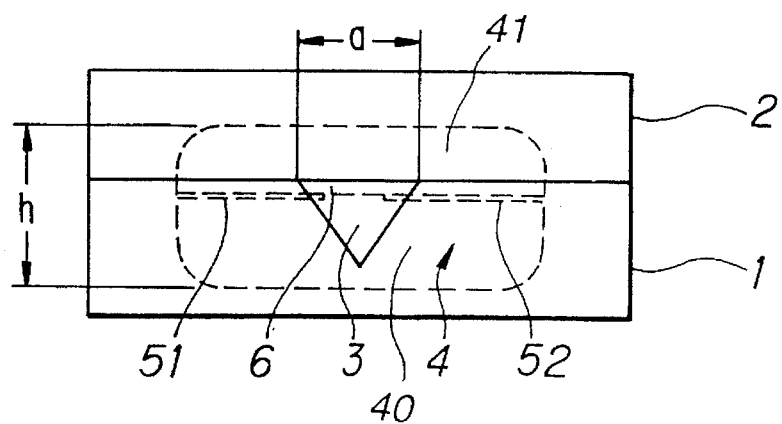
FIG. 2 is a sectional view taken along the plane A—A of FIG. 1 showing the complete sensor body.
Figure 3:
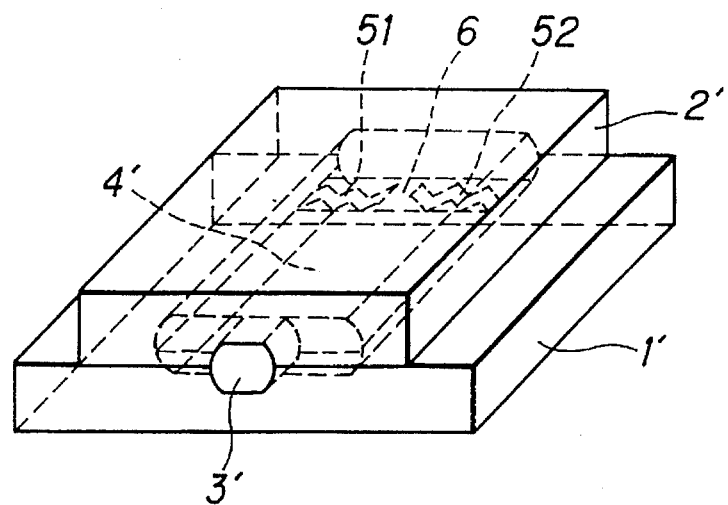
FIG. 3 is a perspective view showing a body of a semiconductor type gas rate sensor.
Figure 4:
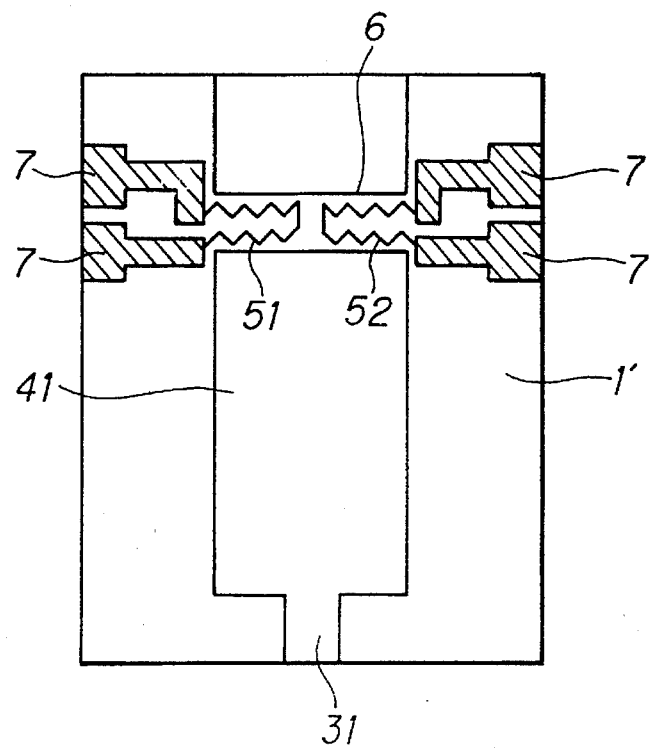
FIG. 4 shows a plan view of a lower semiconductor substrate of the sensor body shown in FIG. 3.
Figure 5:
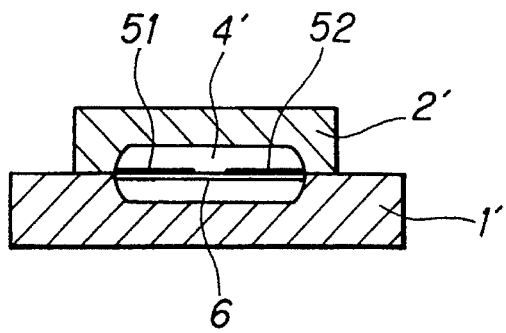
FIG. 5 is a front sectional view of the sensor body shown in FIG. 3.

Referring to FIGS. 1 and 2, a gas rate sensor according to the present invention has a body which is constructed in such a way that a lower semiconductor substrate 1 having a half nozzle port 30 and a half groove 40 etched thereon and an upper semiconductor substrate 2 having a half nozzle port 30 and a half groove 41 etched thereon are bonded to each other so as to precisely couple the half ports 30 and the half grooves 40, 41 to form a nozzle port 3 and a gas path 4 in the assembled body.

In order to form the nozzle port, the half-nozzle port 30 made in the lower semiconductor substrate 1 has a section of an isosceles triangle whose base side is parallel to a connecting face of the lower and upper semiconductor substrates 1 and 2.

The nozzle port 3 is provided at its inlet side with an integrally formed buffer chamber 8 which buffers any noise component, e.g., pulsation of the gas flow caused by driving a miniature pump to force the gas into the gas path in the sensor body.

The lower semiconductor substrate 1 has a gas inlet 9 and a gas outlet 10 formed therein.

The sensor body thus constructed is placed in a container (not shown) filled with inert gas, e.g., nitrogen ($N_2$) or argon (Ar) having characteristics similar to air to produce a gas flow in the gas path 4 of the sensor body by circulating the gas through said sensor body by the use of the miniature pump.

In this case, to accurately sense with a sufficient sensitivity an angular velocity acting on the sensor body, it is necessary to create an optimal flow of gas injected into the gas path 4 through the nozzle port 3, which satisfies the following conditions:

(a) With no angular velocity acting on the sensor body, gas forced by the miniature pump into the gas path 4 through nozzle port 3 must form a straight stream along the center line of the gas path 4.

(b) The gas injected through the nozzle port 3 must form a flow of a sharp directivity with a steep slope of flow-velocity distribution characteristics enough to reach a pair 5 of heat wires 51 and 52 provided in the gas path 4.

(c) The gas must form a stable laminar flow being free from noise components such as pulsating streams.

(d) The gas flow must have a suitable velocity and can freely deflect in response to an angular velocity acting on the sensor body.

To produce the gas flow in the gas path 4 through a nozzle port 3, which satisfies the above-mentioned necessary conditions, the present invention provides the sensor whose body is designed according to the following sizes and forms of its components:

(1) Width "a" of the nozzle port 3 must be within 300–1000 microns. In a case when the nozzle port has a circular, elliptic or a form other than a triangle, the maximal opening width must be within 300–1000 microns.

When the nozzle port 3 has a width "a" smaller than 300 microns, the gas ejected therefrom can not be of a sufficient flow rate, i.e., the gas flow widely spreads after passing through the nozzle port and, thereby, can not flow straight with a sharp velocity distribution to the paired heat wires. With the nozzle port 3 having a width "a" larger than 1000 microns, it is impossible to obtain a necessary flow rate without increasing the capacity of the miniature pump. This results in undesirably decreasing the efficiency of the miniature pump.

(2) Length "b" of the nozzle port 3 must be 1 to 5 times the nozzle port width "a".

If the nozzle port 3 has a length "b" smaller than the width "a", gas injected into the gas path 4 through the nozzle port 3 can not form a straight directional flow due to the non-sharp or steep slope of the gas velocity distribution. If the nozzle port 3 has a length "b" in excess of five (5) times the width "a", gas injected into the gas path 4 through the nozzle port 3 can have a sufficient flow rate but the nozzle port is considerably elongated and, thereby, a dead space is correspondingly increased, leading to an increase in the size of the sensor body. Furthermore, the flow resistance of gas due to its kinematic viscosity increases, resulting in decreasing its flow rate.

(3) A distance "l" from the open end of the nozzle 3 to a pair of heat wires must be 3 to 50 times the nozzle port width "a".

The larger the distance "l" is, the higher the sensitivity of the sensor by virtue of the increased deflection of gas flow responding to the angular velocity acting on its body. On the other hand, the gas injected into the gas path through the nozzle port 3 may straight flow with a sharp velocity distribution when the nozzle port distance "l" is not more than 50 times the nozzle port width "a". Consequently, it is suited to select the distance "l" within 3 to 50 times the nozzle port width "a".

(4) A distance "d" between paired heat wires 51 and 52 must be 0.5 to 2 times the nozzle port width "a".

The detection sensitivity of the sensor may have a peak when the distance "d" between the paired heat wires is selected within 0.5 to 2 times the nozzle port width "a". With the distance "d" being out of the above-mentioned range, the detection sensitivity decreases.

(5) A width "W" of the gas path 4 must be within 2–6 mm.

As the width "W" of the gas path 4 increases the gas flow is less limited by the walls of the gas path to increase the detection sensitivity. With the gas path having a width "W" smaller than 2 mm, the distance from the each side wall to the center flow line is too small to form a stable flow. When the gas path is larger than 6 mm in width "W", it may increase the size of the sensor body and complicate forming a bridge for providing a pair 5 of heat wires 51 and 52.

(6) A depth "h" of the gas path 4 must be within 400–500 microns.

The detection sensitivity decreases if the gas path 4 has an insufficient depth since turbulence may arise by reason of the upper and lower walls of gas path 4. An increase in the depth "H' of the gas path 4 increases the detection sensitivity if the depth "H' lies in the range of 400 to 1500 microns. With the gas path of less than 400 microns in depth, the sensor can not have a sufficient sensitivity. To form the gas path of more than 1500 microns, it requires much more time to etch the semiconductor substrates of increased thickness, and results in increasing the size of the sensor body.

(7) a pair of heat wires 5 must be leveled at the center of the depth of the gas path 4.

The maximal sensitivity of detection of an angular velocity can be obtained when the paired heat wires lie at the center level of the gas path in the direction of its depth. A positioning error of several ten microns to several hundred microns is permissible.

Figure 6:
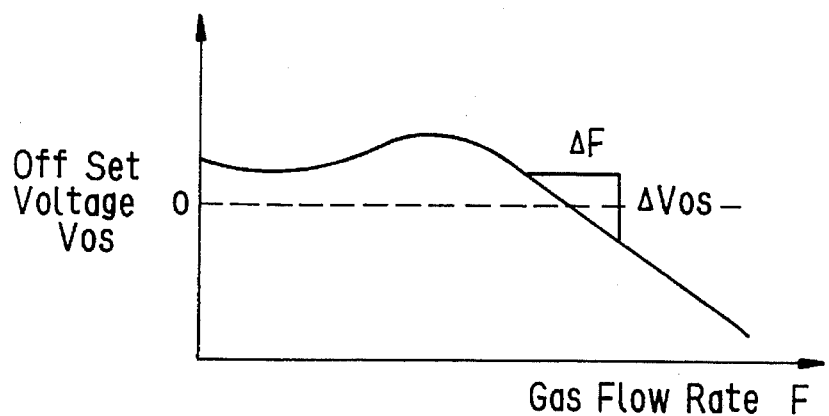
FIG. 6 is a characteristic diagram of offset voltage versus flow rate of gas forced into a gas path.

The miniature semiconductor type gas rate sensor thus constructed and manufactured by micro-machining has characteristics, shown in FIG. 6, of offset voltage (output voltage of the sensor with no angular velocity applied to its body) in relation to a flow rate of gas forced into the gas path 4 in its body. The gradient of the characteristic curve at an operating point, e.g., a gas flow-rate F of 60 to 80 SCCM, which is a relationship between offset voltage change $\Delta F$, may have a strong influence on the design performance of the sensor.

Accordingly, an important key to improve the sensor performance is to make the characteristic curve of FIG. 6 as flat as possible at the operating point.

For example, the representative performance items of the sensor to be influenced by the above-mentioned characteristics are the stability of the offset voltage (elapsed time drift, temperature drift) and noise components.

A problem concerning the offset voltage stability is such that a gas flow rate is determined by the accuracy of the flow-rate control system including a pump and its driving circuit but may delicately vary in response to a time elapsed drift and a temperature change, i.e., a gas-flow-rate change $\Delta F$ may cause an offset-voltage change $\Delta Vos$.

A problem concerning the noise components is such that a flow of gas injected by a piezo-type miniature pump into the gas path 4 through type nozzle port is incomplete laminar and contains pulsating components caused by the operation of the pump, i.e., the flow may always fluctuate in every point of time and position. Accordingly, there is a gas-flow-rate change $\Delta F$ that may cause an offset-voltage change $\Delta Vos$.

To improve the performance characteristics of the sensor as to the offset voltage stability and noise components, it is necessary to use a pair 5 of heat wires 51 and 52 which have the same resistance against a constant gas flow-rate.

It is also necessary to improve the symmetry of the nozzle port 3. For this purpose, anisotropical (KOH) etching of the half nozzle port 30 in the lower semiconductor substrate 1 is carried out after aligning a silicon crystal-face orientation thereof with a mask.

To achieve the above-mentioned improvement of the performance characteristics of the sensor according to the present invention, a nozzle port 3 of not less than 2 mm in length is formed to inject gas into the gas path 4 to form a stable gas stream having a good linearity without variation of flow rate.

At a place of 2 mm or less from the inlet of the nozzle port 3, there is an increased turbulence (including a pulse stream from the pump) with a decreased linearity of the stream. As this gas stream moves in the nozzle port, it is gradually rectified and converted into a laminar flow of a high linearity.

Figure 7:
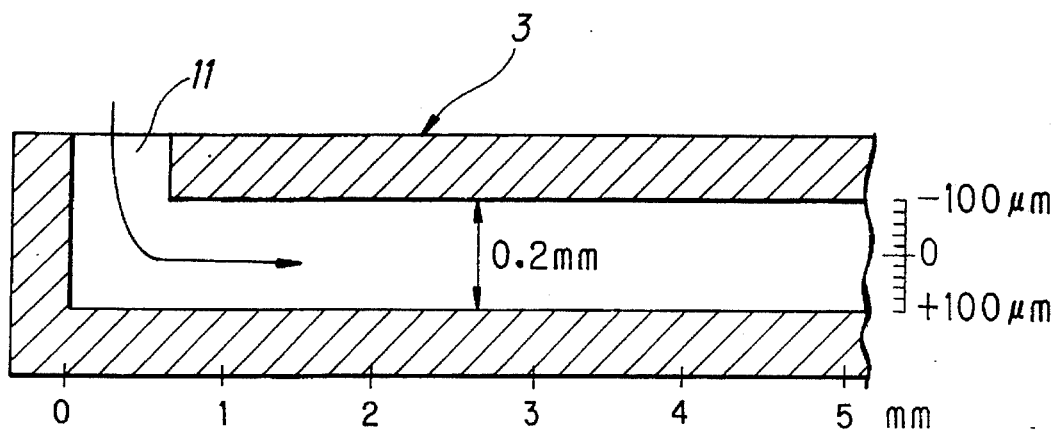
FIG. 7 is a sectional view of an example of a nozzle port.
Figure 8:
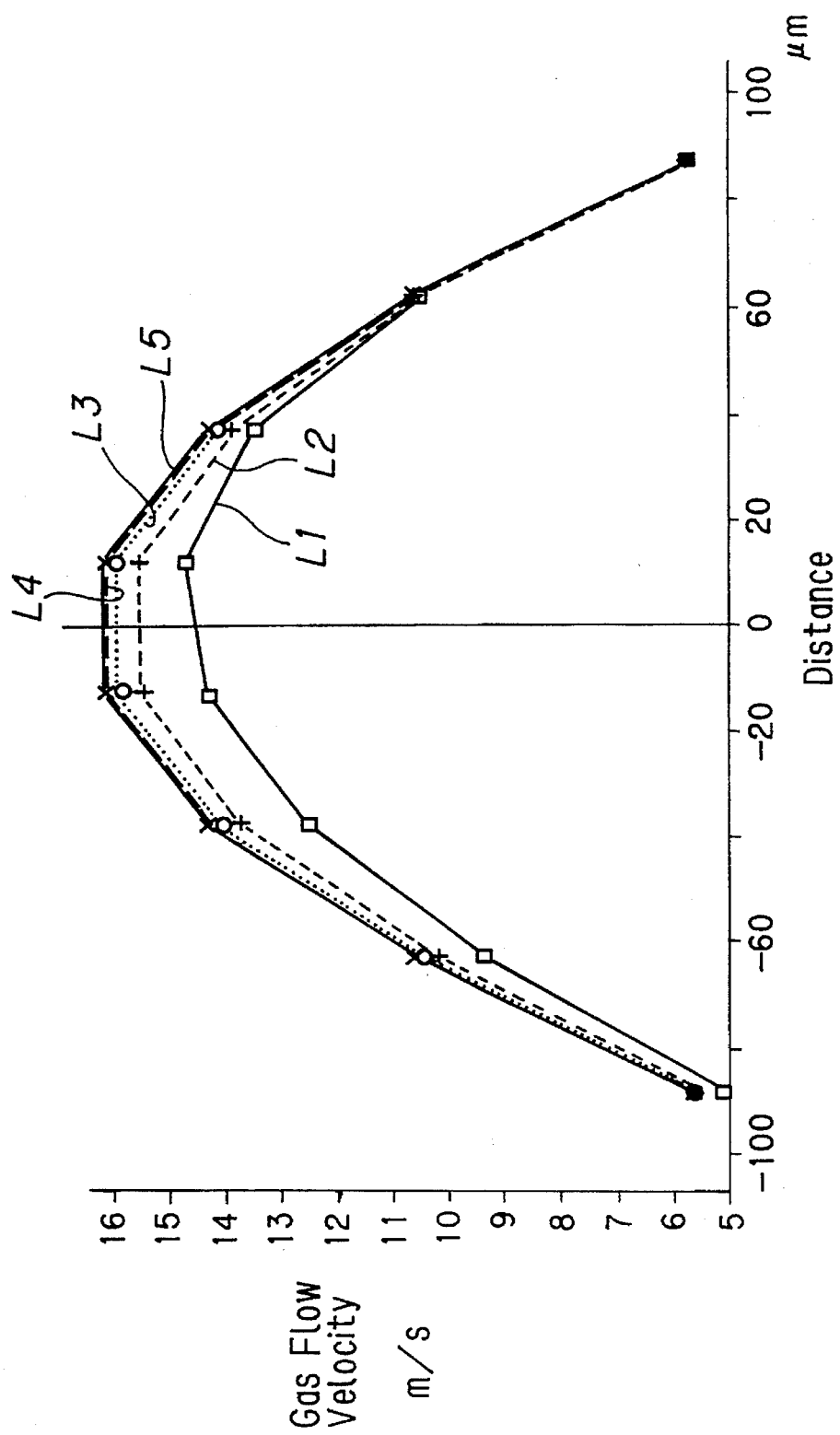
FIG. 8 is a characteristic diagram showing a distribution of gas flow rates measured at points along a nozzle port.

An experiment with a nozzle port 3 of 0.2 mm in width and 5 mm or more in length, which is shown in FIG. 7, was made by introducing gas through an inlet 11 provided at one side thereof and measuring the distribution of flow velocity values at different points therein. The measurement results are shown in FIG. 8. The characteristic curve L1 shows a distribution of the right and left gas-streams' velocity values measured at a position of 1 mm in length inwardly from the inlet side of the nozzle port 3, L2 at a position of 2 mm, L3 at a position of 3 mm, L4 at a position of 4 mm and L5 at a position of 5 mm respectively.

Figure 9:
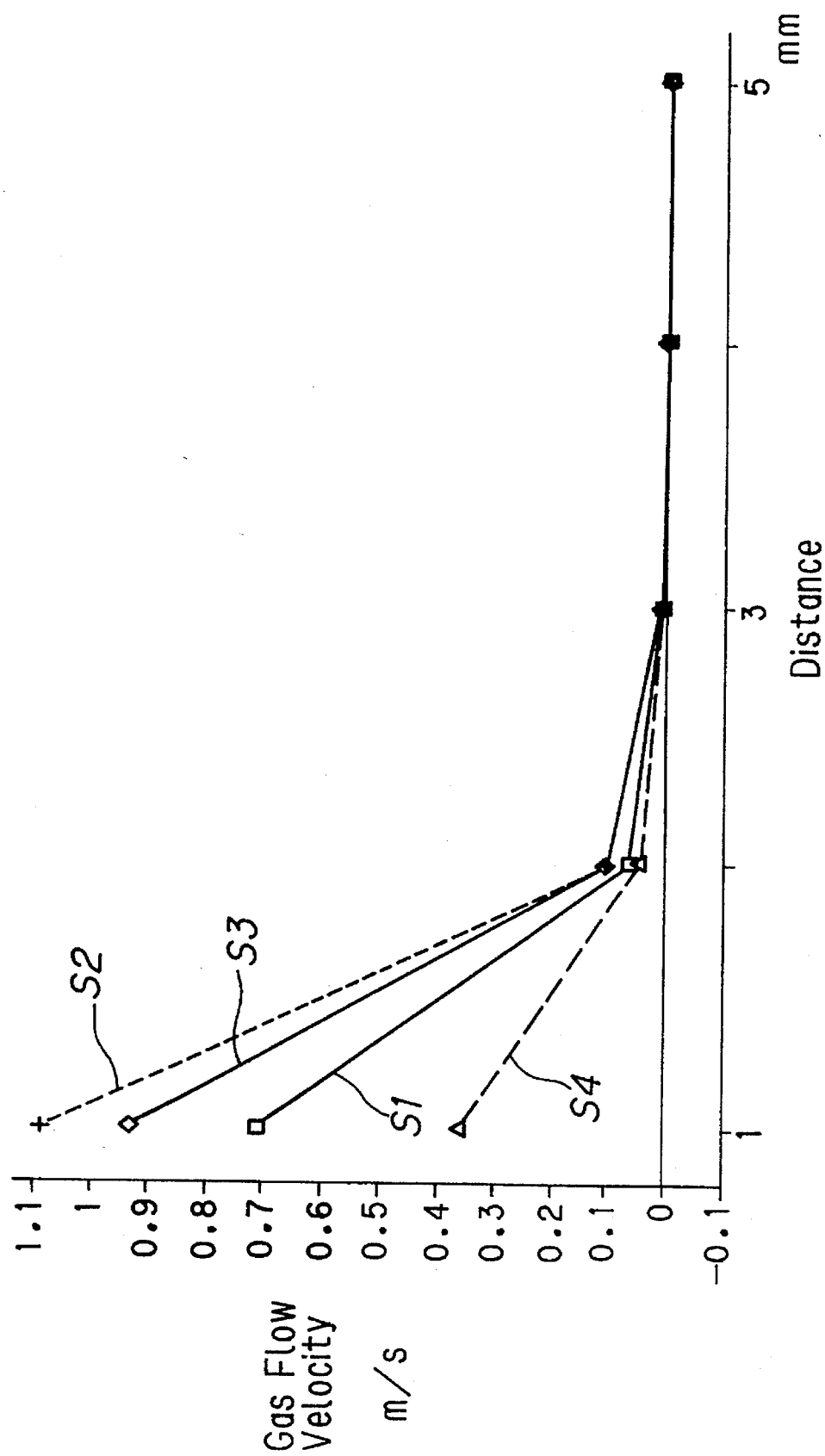
FIG. 9 is a characteristic diagram showing a difference of gas flow rates measured at the left-hand and right-hand positions along a nozzle port.

FIG. 9 shows curves obtained by plotting differential velocity values of the left and right gas streams at respective measuring positions of the nozzle port 3 shown in FIG. 7 (i.e., differences of left- and right streams' characteristics of FIG. 8). The curve S1 relates to a difference in the velocity values of streams at symmetrical positions +87.5 and −87.5 microns, S2 at symmetrical positions +62.5 and −62.5 microns, S3 at symmetrical positions +37.5 and −37.5 microns and S4 at symmetrical positions +12.5 and −12.5 microns, respectively.

As is apparent from the characteristic curves of FIGS. 8 and 9, a stabilized gas flow represents the left-to-right symmetry in the nozzle port 3. A nozzle port 3 of not less than 2 mm in length can attain a very symmetrical gas flow.

Figure 10:
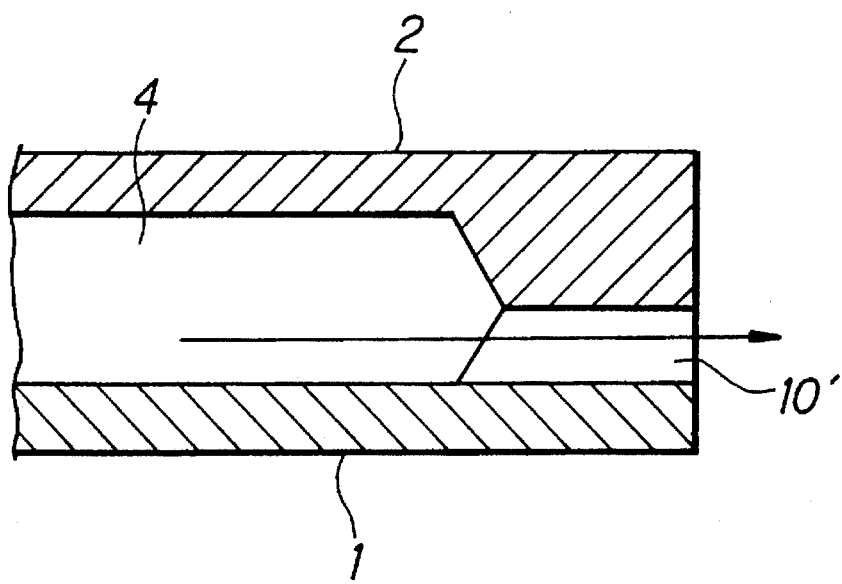
FIG. 10 is a side sectional view of a part of a sensor body, wherein a gas outlet is provided at the innermost portion of a gas path.

To further improve the performance of the sensor, the present invention proposes to provide an outlet 10' in the downstream end of the gas path 4, as shown in FIG. 10, for the purpose of allowing the gas to flow straight out from the gas path. Practically, a half groove is made at an end-position opposite to the nozzle port 3 on the lower semiconductor substrate 1 to form an outlet 10' of the sensor body when the upper semiconductor substrate 2 is bonded to the lower semiconductor substrate 1.

This outlet allows gas to flow straight out from the gas path 4 therethrough (without deflection), preventing reverse disturbance of the gas flow in the gas path 4.

Figure 11:
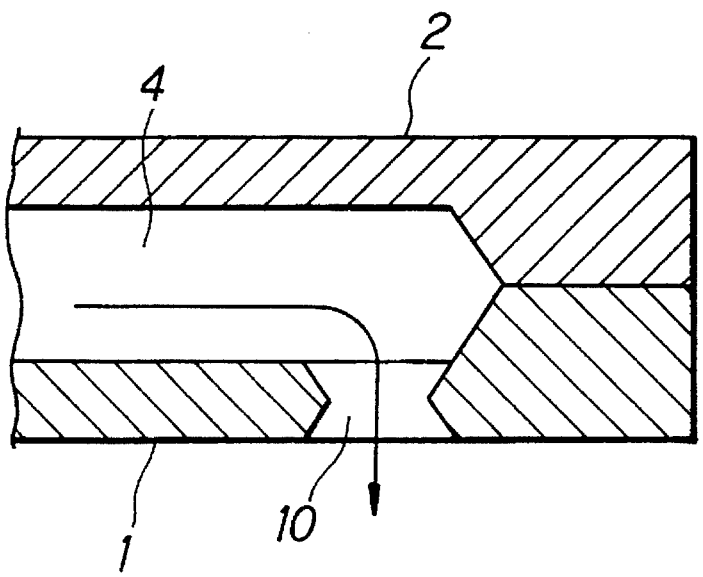
FIG. 11 is a side sectional view of a sensor body portion, wherein a gas outlet is provided at the bottom of a gas path.

With the gas outlet 10 provided in the bottom of the lower semiconductor substrate 1 as shown in FIG. 11, it can not be avoided that gas is forced to reflect at the end wall and change its direction toward the outlet, resulting in disturbing the gas flow in the gas path 4.

With the gas path 4 extending from the nozzle port 3 of not less than 2 mm in length and provided at its downstream end with the outlet 10' allowing gas to flow straight out from the gas path therethrough, it is possible to produce a stable directional laminar gas-flow therein with the result of a remarkable increase in the sensor performance.

As is apparent form the foregoing description, the semiconductor type gas rate sensor according to the present invention offers an advantage that it is capable of accurately detecting an angular velocity acting on its sensor body with a sufficiently increased sensitivity that is attained by optimally designing the sensor body in its detailed size and form, i.e., by first selecting a nozzle port width in the range 300 to 1500 microns and, then, determining a nozzle port length, a distance between a nozzle port open-end and a pair of heat wires and a space between paired heat wires on the basis of the selected nozzle port width so as to create an optimal flow of gas injected into the gas path through the nozzle port.

The semiconductor type gas rate sensor according to the present invention has an increased detection performance that is attained by providing a gas path with a nozzle port of not less than 2 mm in length and at is downstream end with an outlet allowing gas to flow straight out from the gas path therethrough, and, thereby, creating a stable directional laminar flow of gas in the sensor body.

What is claimed is:

1. A gas rate sensor for detecting an angular velocity acting on a sensor body made of a lower semiconductor substrate and an upper semiconductor substrate, said substrates being coupled with each other and having a nozzle port and a gas path etched therein and having a pair of heat wires, disposed in said gas path said wires being heat-sensitive resistance elements provided in the gas path, the angular velocity being detected by electrically sensing a deflection of a flow of gas injected into the gas path through the nozzle port as a change of resistance in the heat wires wherein the nozzle port is made in the lower semiconductor substrate, said nozzle port having a section of an isosceles triangle whose base side is parallel to a connecting face of lower and upper semiconductor substrates, the nozzle port having a width of 300 to 1000 microns.

2. A gas rate sensor as defined in claim 1, wherein the nozzle port has a length of 1 to 5 times the nozzle port width.

3. A gas rate sensor as defined in claim 1, wherein a distance from an open end of the nozzle port to the paired heat-wires is 3 to 50 times the nozzle port width.

4. A gas rate sensor as defined in claim 1, wherein a space between paired heat-wires is 0.5 to 2 times the nozzle port width.

5. A gas rate sensor as defined in claim 1, further comprising a gas outlet at a downstream end of the gas path constructed and arranged to allow the gas to flow straight out from the gas path through the gas outlet.

6. A gas rate sensor for detecting an angular velocity acting on a sensor body made of semiconductor substrates having a nozzle port and a gas path etched therein and having a pair of heat wires, disposed in said gas path said wires being heat-sensitive resistance elements provided in the gas path, the angular velocity being detected by electrically sensing a deflection of a flow of gas injected into the gas path through the nozzle port as a change of resistance in the heat wires, wherein the nozzle port has a length of not less than 2 millimeters, said nozzle port having a cross section of an isosceles triangle.

7. A gas rate sensor as defined in claim 6, wherein a gas outlet is provided at a downstream end of the gas path to allow the gas to flow straight out from the gas path through the gas outlet.

8. A gas rate sensor as defined in claim 6, wherein the nozzle port has a width of 300 to 1000 microns.

9. A semiconductor type gas rate sensor as defined in claim 8, wherein that a distance from an open end of the nozzle port to the paired heat-wires is 3 to 50 times the nozzle port width.

10. A gas rate sensor as defined in claim 8, wherein a space between paired heat-wires is 0.5 to 2 times the nozzle port width.

11. A gas rate sensor as defined in claim 8, further comprising a gas outlet at a downstream end of the gas path to allow the gas to flow straight out from the gas path through the gas outlet.

12. A gas rate sensor for detecting an angular velocity acting on a body of the sensor, the sensor being made of semiconductor substrates having a nozzle port and a gas path etched therein and having a pair of heat wires, disposed in said gas path said wires being heat-sensitive resistance elements provided in the gas path, the angular velocity being detected by electrically sensing a deflection of a flow of gas injected into the gas path through the nozzle port as a change of resistance in the heat wires, an improvement in the sensor comprising, the nozzle port having a width of 300 to 1000 microns, the nozzle port having a length of 1 to 5 times the nozzle port width, the gas path having a distance from an open end of the nozzle port to the paired heat-wires is 3 to 50 times the nozzle port width, and a space between the paired heat-wires being 0.5 to 2 times the nozzle port width.

13. A semiconductor type gas rate sensor as defined in claim 12, wherein the nozzle port has a length of not less than 2 millimeters.

14. A gas rate sensor as defined in claim 12, further comprising a gas outlet at a downstream end of the gas path to allow the gas to flow straight out from the gas path through the gas outlet.

* * * * *

UNITED STATES PATENT AND TRADEMARK OFFICE
CERTIFICATE OF CORRECTION

PATENT NO.  : 5,610,333
DATED       : March 11, 1997
INVENTOR(S) : TAKASHI HOSOI, ATSUSHI INABA and MIZUHO DOI It is certified that error appears in the above-identified patent and that said Letters Patent is hereby corrected as shown below:

In column 6, line 53 (claim 9 line 1 thereof), delete "semiconductor type".

In column 6, line 54 (claim 9 line 2 thereof), delete "that".

In column 8, line 1 (claim 13 line 1 thereof), delete "semiconductor type".

Signed and Sealed this

Twenty-eighth Day of July, 1998

Attest:

BRUCE LEHMAN

Attesting Officer

Commissioner of Patents and Trademarks